United States Patent [19]

Noble

[11] 4,295,607
[45] Oct. 20, 1981

[54] LAND IRRIGATING SYSTEM AND METHOD

[76] Inventor: Allen T. Noble, P.O. Box 1201, Boise, Id. 82701

[21] Appl. No.: 48,886

[22] Filed: Jun. 15, 1979

Related U.S. Application Data

[63] Continuation-in-part of Ser. No. 923,291, Jul. 10, 1978, abandoned, which is a continuation-in-part of Ser. No. 887,792, Mar. 17, 1978, abandoned.

[51] Int. Cl.³ .............................................. A01G 25/09
[52] U.S. Cl. ...................................... 239/1; 239/183; 239/711; 239/721
[58] Field of Search ............... 239/178, 183, 184, 212, 239/709, 711, 718–721; 137/344

[56] References Cited

U.S. PATENT DOCUMENTS

| | | | |
|---|---|---|---|
| 3,444,941 | 5/1969 | Purtell | 239/183 |
| 3,729,016 | 4/1973 | Von Linslowe | 239/212 |
| 3,902,668 | 9/1975 | Daugherty et al. | 239/184 |
| 3,970,102 | 7/1976 | Harvey | 239/183 |
| 4,159,080 | 6/1979 | Standal | 239/183 |

FOREIGN PATENT DOCUMENTS 434918 11/1974 U.S.S.R. ............................. 239/183

*Primary Examiner*—Andres Kashnikow
*Attorney, Agent, or Firm*—Shanley, O'Neil and Baker

[57] ABSTRACT

A land irrigation system in which a traveling sprinkler line is supplied with water from a stationary water supply conduit extending in the direction of movement of the sprinkler line, the apparatus of the invention being designed to supply water to the sprinkler line from spaced risers forming part of the water supply conduit. A conveyance moving along the water supply conduit supports a water carrying arm having a coupling at one end for successive connection to water outlet valves on the risers as the conveyance moves along the length dimension of the water supply conduit. The water outlet at the other end of the water carrying arm is connected for water flow to the water inlet of the sprinkler line during rotation of the water carrying arm by means of a continuous water flow arrangement. The conveyance when intermediate two risers stops and the coupling at the one end of the water carrying arm is disconnected from one riser. A power device then rotates the water carrying arm to bring the coupling into registry with the next riser. The coupling then connects with the water outlet valve of that riser and movement of the conveyance resumes. Provision is made for moving the water carrying arm supporting apparatus relative to the stationary water supply conduit while accommodating the length of the coupled water carrying arm. A method of supplying water to a traveling sprinkler line is also disclosed.

14 Claims, 12 Drawing Figures

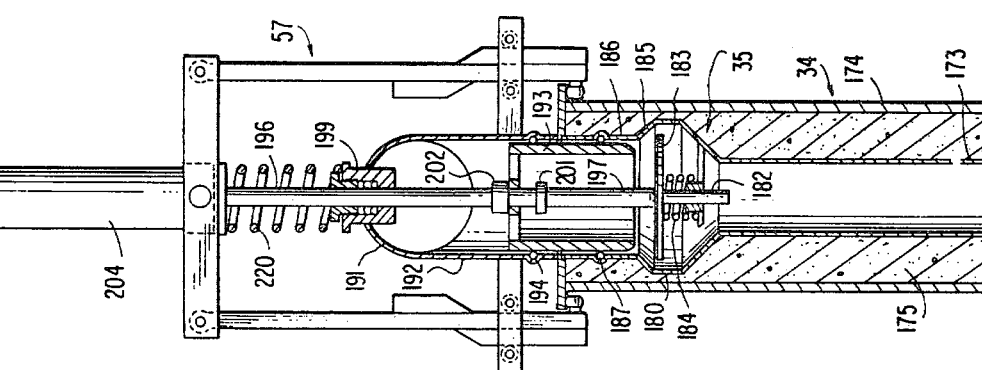
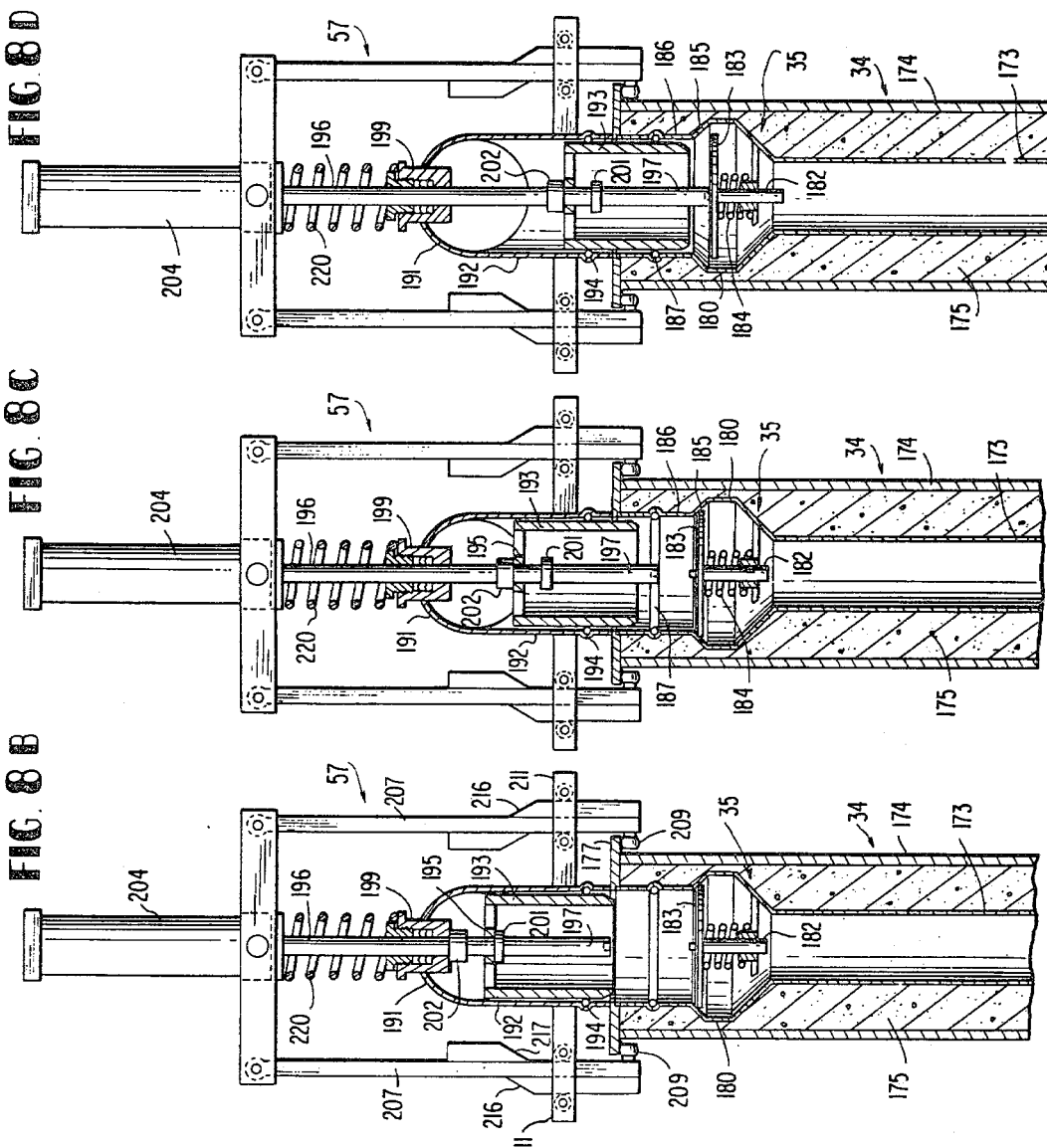
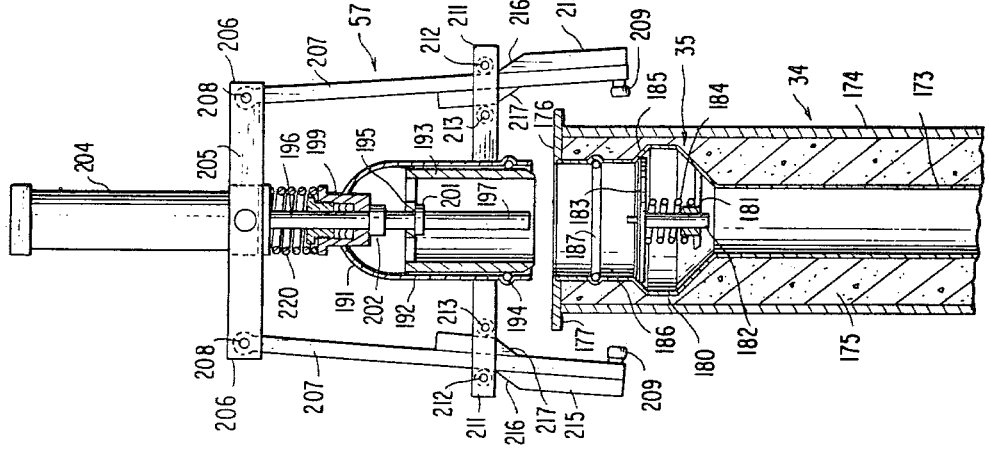

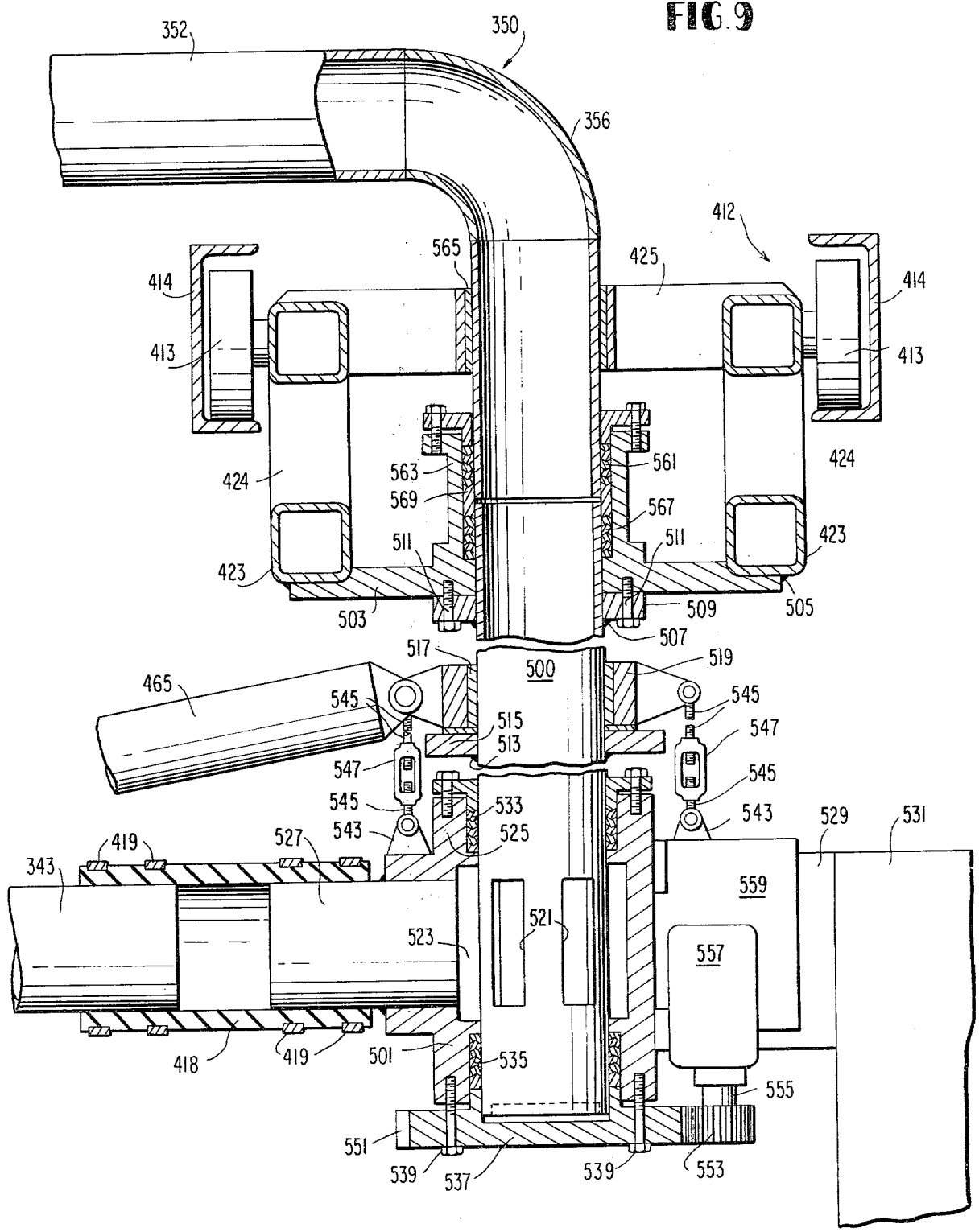

LAND IRRIGATING SYSTEM AND METHOD

RELATED APPLICATIONS

This application is a continuation-in-part application of application Ser. No. 923,291, filed July 10, 1978, now abandoned, which in turn was a continuation-in-part application of application Ser. No. 887,792, filed Mar. 17, 1978, now abandoned in favor of continuation application Ser. No. 170,072, filed July 18, 1980.

BACKGROUND OF THE INVENTION

When irrigating extensive areas of land, long sprinkler lines have been used for some time. Water has been supplied to these lines from buried pipes called main lines with spaced risers projecting above the surface of the ground for connection to the sprinkler lines. Each time a sprinkler line had to be disconnected from a riser to be moved to another riser, manual labor was required for this purpose. This was a laborious and time consuming operation. As time went on, the sprinkler lines, which can reach a length of a quarter of a mile and more were fitted with wheels to make them easier to move after disconnection from a riser. Eventually, power was supplied in one way or another to the wheeled lines to keep them moving slowly along the desired path parallel to the direction of the main line with flexible hoses extending between the water inlet end of the sprinkler lines and consecutive risers to which the sprinkler line was connected. Since the main line can be eight or more inches in diameter with the water pressure in the main line high, the required size and strength of the flexible hoses became extremely burdensome in manual operation. Proposals were therefore made to facilitate connection of the sprinkling lines to successive risers with the least manual effort. However, to applicant's knowledge no successful machine has been developed prior to his. Five examples of such proposals are illustrated in Engel U.S. Pat. No. 2,740,228, Stafford U.S. Pat. No. Re. 26,285, Purtell U.S. Pat. No. 3,444,941 and Smith et al. U.S. Pat. Nos. 3,381,893 and 3,446,434. The patented proposals provided complicated arrangements for connection of the sprinkler line to successive risers of the main line utilizing power assisted mechanical devices for handling a flexible hose connection (Engel and Purtell patents), a telescoping pipe (Stafford patent) and segmented swivel jointed pipes (Smith et al. patents) to achieve a nearly continuous water supply to the moving sprinkler line.

When it is considered that the connection between the main line and the sprinkler line may extend to six inches and more in diameter, the mechanical problems inherent in the patented devices will be apparent and probably constituted a barrier to the success of the patented developments in the field.

In the system of the present invention, the mechanical difficulties and complexities of the prior systems with their resulting operating and maintenance disadvantages have been eliminated by the provision of a single pivoted or rotatable connecting pipe or rigid water carrying arm effectively mounted and arranged for successive coupling with novel valves in consecutive risers on a main line by virtue of this single pipe or arm having a water outlet connected to a rotatable water receiving junction means which is carried along the length of the water main by a conveyance, the water outlet of the rotatable water receiving junction means being connected to the water inlet end of the sprinkler line through a swivel joint conduit. The conveyance carries the apparatus along and the single water carrying arm is successively connected to consecutive risers. Movement of the conveyance is halted at a midpoint between risers and power actuated means act to rotate the single water carrying arm around to position the water inlet end of the arm in registry with the succeeding riser. Means are provided at the water inlet end of the arm to make water flow connection with the succeeding risers. An important component of the present invention is a novel means for accommodating the fixed length of the water carrying arm or pipe as it rotates around each riser means while the conveyance moves along a path parallel to the main line.

The present invention incorporates features of the inventions covered by the parent patent applications but makes possible the use of an appreciably smaller and more economical conveyance, an aspect which taken with the reduction in the number of water carrying arms, greatly reduces the cost of the machine of the present invention relative to that of the earlier machines.

SUMMARY OF THE INVENTION

For use in connection with a land irrigating system in which a moving water sprinkler means having water inlet means at one point extends laterally to and moves along the length dimension of a stationary water supply means having a plurality of water outlet valve means at spaced points along the length thereof, an apparatus for successively connecting water outlet valve means of the stationary water supply means with water inlet means of the sprinkler means comprising conveyance means for moving along the length dimension of the stationary water supply means at the same overall rate of movement as the moving sprinkler means, an elongated water conduit means rigid from one end portion to the other end portion, support means carried by the conveyance for pivotally supporting the elongated water conduit means by the conveyance for rotation of the elongated water conduit means around one end portion of the elongated water conduit means, means connecting the one end portion of the water conduit means for uninterrupted water flow to the inlet of sprinkler line as the elongated water conduit means rotates, connecting means at the other end portion of the elongated water conduit means for rotational water flow connection with the successive water outlet valves, means carried by the conveyance means for mounting the support means for movement relative to the conveyance means toward and away from the main line to accommodate the length of the elongated water conduit means, and power actuated means for rotating the elongated water conduit means around the one end of the elongated water conduit means when the connecting means is disconnected from one water outlet valve means to bring the connecting means of the elongated water conduit means into contiguity with a successive water outlet valve means of the stationary water supply means in the direction the conveyance has been moving along the length dimension of the stationary water supply means.

In connection with land irrigation wherein a moving sprinkler means having a water inlet means at one point moves along the length of a stationary water supply means having a plurality of water outlet valve means at spaced intervals along the length thereof, the method of successively connecting water outlet valve means of the stationary water supply means with water inlet means of the water sprinkler means to obtain substantially continuous water supply to the sprinkler means comprising providing a conveyance means for movement along the length dimension of the stationary water supply means at the same overall rate of movement as the moving water sprinkler means, the conveyance means carrying a support means supporting an elongated water conduit means for rotation of the elongated conduit means around one end portion of the elongated water conduit means, the elongated water conduit means being rigid from one end portion to the other end portion and having water outlet means connecting said one end portion of the elongated water conduit means for continuous water flow from the elongated water conduit means to the water inlet means of the water sprinkler during rotation of the elongated water conduit means, the elongated water conduit means having connecting means at the other end portion of the elongated water conduit means for rotatable water flow connection of the elongated water conduit means with any water outlet valve means, the steps including rotating the elongated water conduit means around the one end portion of the elongated water conduit means to bring the other end portion of the elongated water conduit means into contiguity with a water outlet valve means, rotatably connecting the connecting means at the other end portion of the elongated water conduit means to the contiguous water outlet valve means for water flow through the elongated conduit means to the sprinkler means, subsequently rotating the so-connected elongated conduit means around the connected water outlet valve means while moving the conveyance means along the length dimension of the stationary water supply means, and accommodating the rigidity of the elongated water conduit means during movement of the conveyance means by supporting the support means for movement toward and away from the stationary water supply means on a movable support means carried by the conveyance means, the movement being between a position of the support means closest to the water supply means when the conveyance means is far from any one of the water outlet valve means and a position of the support means farthest from the water supply means when the conveyance means is close to any one of the plurality of water outlet valve means.

BRIEF DESCRIPTION OF THE DRAWINGS

FIGS. 8A, 8B, 8C and 8D are views in vertical section of the structure illustrated in FIGS. 6 and 7 with the operating parts shown in different functional positions, and FIG. 9 is a view similar to FIG. 4 of a modification of the component of FIG. 4.

DESCRIPTION OF THE PREFERRED EMBODIMENTS

Figure 1:
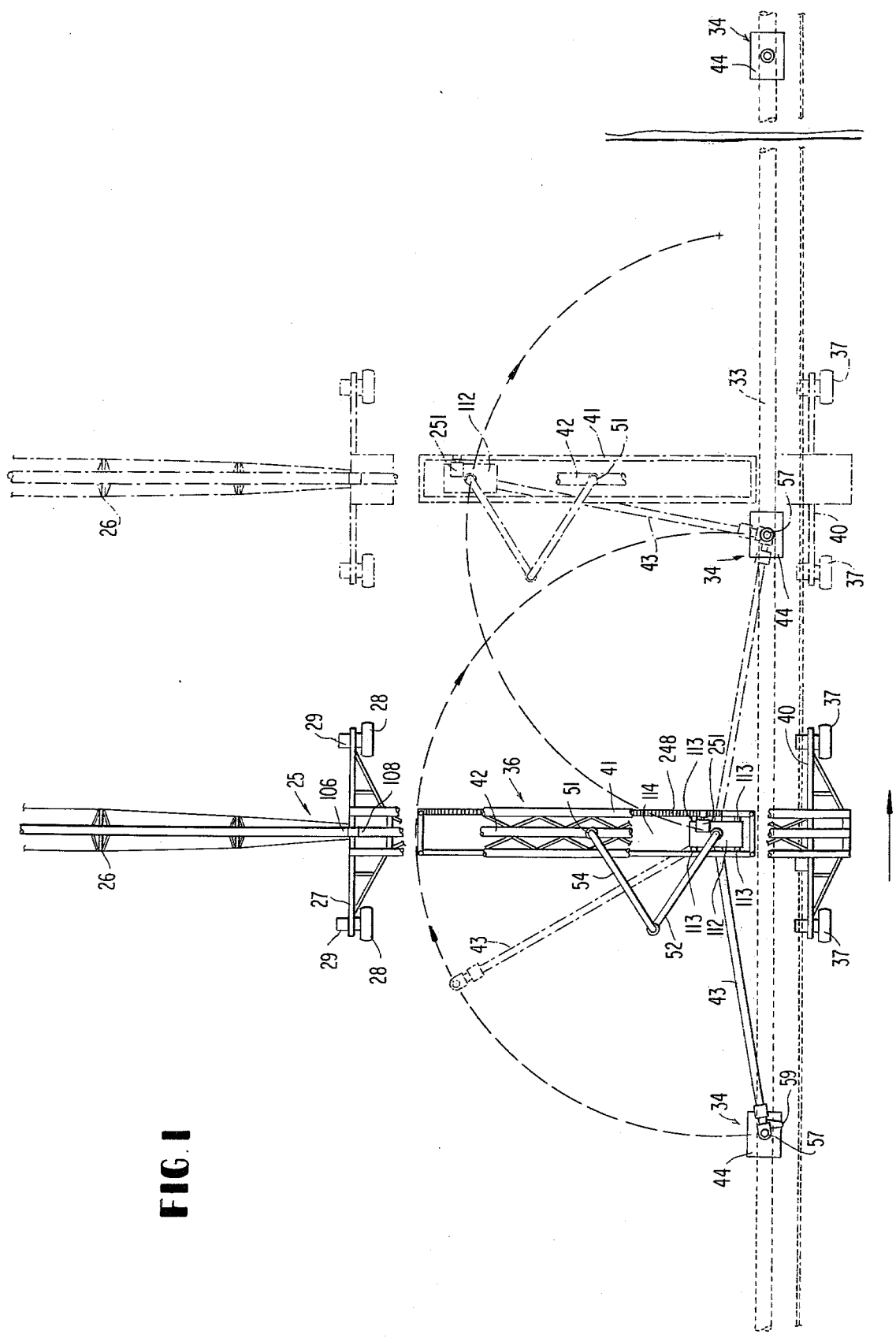
FIG. 1 is a plan view of the system of the present invention connected to a sprinkler line.

Referring to the drawings, reference numeral 25 indicates generally one end portion of a conventional linear movement water sprinkler line supported on a bowstring truss 26, the illustrated end of the sprinkler line terminating at a special tower 27 having ground engaging wheels 28 driven by electric motors 29. Tower 27 forms one end of a tractor indicated generally at 36, the other end of which tractor is supported by a tower 40 similar to tower 27 mounted on ground engaging wheels 37 driven by electric motors 24. Tractor 36 includes an open work truss 41 extending between tower 27 and tower 40. Reference numeral 33 indicates an underground main line for supplying water to sprinkler line 25 through a series of linearly spaced risers, each indicated generally by reference numeral 34. Where desired a concrete pad 44 having a level top surface is installed in the ground at the base of each riser pipe 34, the distance between the top level surface of the pad and the outlet valve being uniformly the same for all risers 34. Wheels supporting the sprinkler line and wheels 28 and 37 are so driven as to cause the sprinkler line and the tractor to move slowly along the field to be irrigated in a direction parallel to the direction of main line 33. Closing the upper end of each riser 34 is a water outlet valve indicated generally at 35 and illustrated more specifically in FIGS. 6, 7 and 8. The tractor is guided by guideline 38 which is shown as an electrical conduit buried in the ground with an electrostatic or electro-inductive pick-up device 39 carried by tractor 26; however, any suitable type of known guidance system can be used. Well-known means assure the synchronism of overall movement between the sprinkler line and the tractor. Truss 41 can include as a component a water carrying pipe 42 connected at its outer end in water flow relationship to the inlet end of the sprinkler line.

Tractor 36 carries a structure, to be described more specifically, mounting a water carrying arm or elongated water conduit 43 for cooperating sequentially with successive valves 35 of consecutive risers 34 so as to maintain a substantially constant water supply to the sprinkler line. In the preferred embodiment of the present invention water carrying arm 43 is connected at its water outlet end in water flow relation (through intermediate elements) to a water receiving conduit junction 45. The latter provides any desired conventional means for rigidly supporting the end of arm 43 during operation of the machine while still presenting a connection that can be disconnected for servicing purposes. Water receiving conduit junction 45 connects the water outlet end portion of arm 43 to the lower or water inlet end of a rigid structural pipe 47 for water flow upwardly to a swivel or rotatable conduit means indicated generally at 49.

Where desired the detachable connection between water carrying arm 43 and rigid pipe 47 of water receiving conduit junction means 45 can be dispensed with and in such case the lower end portion of pipe 47 would constitute a water receiving junction means. In either case the water receiving junction means forms a part of the water flow passageway between arm 43 and conduit 50.

Swivel conduit means 49 constitutes a double swivel connection by virtue of the fact that it connects the upper or water outlet end of rigid pipe 47 for rotation of water receiving conduit junction means 45 and arm 43 in addition to connecting rigid pipe 47 in rotational and water flow relation with the water inlet end of a rigid conduit indicated generally at 50 which is in turn connected to the inlet 51 of the water carrying pipe 42 of truss 41. Conduit 50 is shown made up of a segmented, rigid pipe with swivel connections, the pipe sections 52, 53 and 54 being connected together by identical swivel joints 55, 55 and thence to inlet 51 of pipe 42. At the water inlet end conduit 50 is connected to swivel conduit means 49 by swivel joint elbow 56.

At its outer end, elongated water carrying conduit or arm 43 has a connecting or coupling device indicated generally by the reference numeral 57 which is designed to successively connect or couple with consecutive riser valves 35 in the direction of conveyance 36 and sprinkler line 25 movement. The water carrying arm 43 also has at its outer end a wheeled support structure indicated generally at 58, and a riser pipe locator 59. Each water carrying arm is supported by a cable arrangement comprising a cable 62 passing around a pulley 64, the pulley being connected to a hydraulic cylinder 65. The water carrying arm outboard support structure includes a wheel 69 for successively contacting concrete pads 44 as the water carrying arm connecting or coupling device comes into contiguity with consecutive risers 34.

Certain functional components of conveyance or tractor 36 are indicated as being enclosed in a casing 78 carried by tower 40. These components are shown in phantom rectangle form since the operating elements of these components are well known in the art and per se form no part of the present invention. In respect to these components, reference numeral 80 designates an internal combustion engine which acts as the prime mover for an electric generator 81 which supplies the overall power for the entire apparatus, i.e., the tractor components using power, including the motors 24 and 29 of towers 40 and 27, electronic components of the line and all driving motors of the sprinkler line (not shown). Box 83 represents a collection of electronic components for control of the various to-be-described automatic functions of the system, each component, per se, operating in a manner well known in the art.

It will be apparent that in the embodiment described in the specification and shown in the drawings, water receiving conduit junction 45 and associated structure are support means suspended from above on truss 41 of tractor 36. Truss 41 crosses the water main line and is of sufficient height to support water bearing arm 43 above the risers and of sufficient span between towers 27 and 40 so as not to interfere with rotation of the water bearing arm. It is to be noted that with the single water carrying arm of the present invention, tractor 36 can be shorter and of lighter construction than in the structures of the parent applications.

Figure 2:
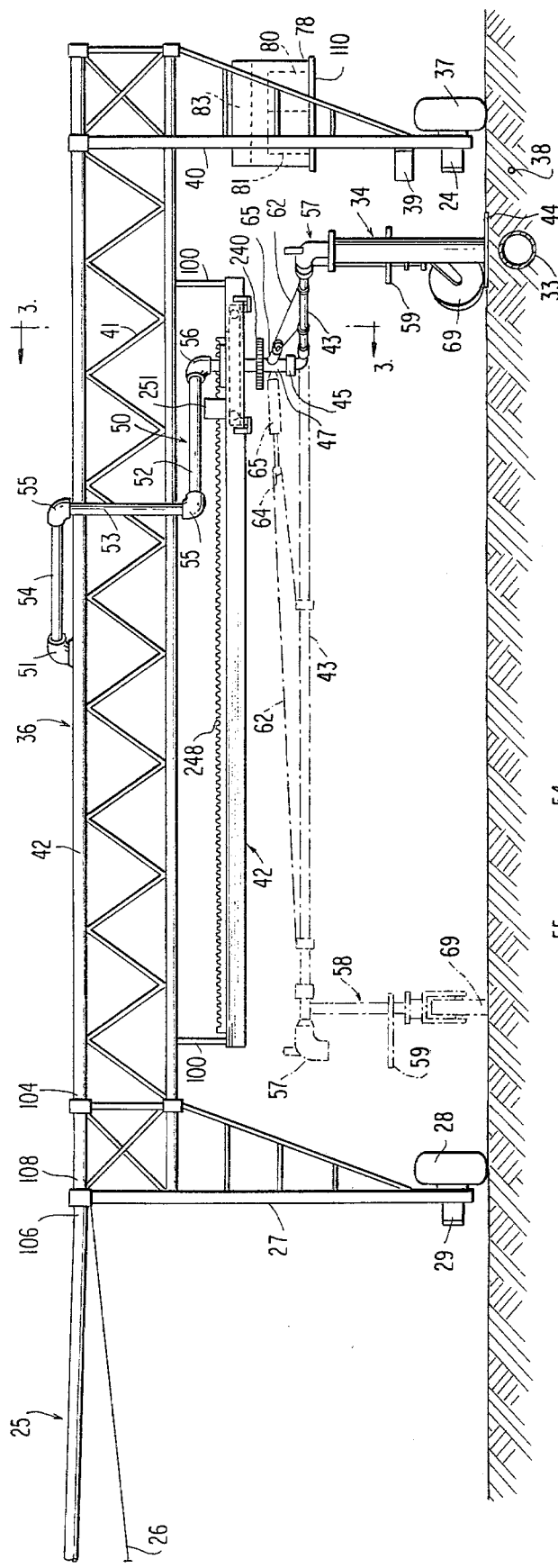
FIG. 2 is a view in side elevation of the system illustrated in FIG. 1, the subterranean water main line and conveyance guide line being shown in section.

In each of FIGS. 1 and 2 elongated water carrying arm 43 and tractor 36 are shown in broken lines as moving to new positions and as progressing down the field being irrigated and thus in successively advanced positions.

In the illustrated embodiment, water carrying pipe 42 of truss 41 connects at its outer end 104 to the inlet pipe 106 of field sprinkler system 25. This connection can be through the intermediacy of a flexible coupling 108 carried by tower 27. Tower 27 takes the place of the tower which in conventional construction would be the first tower of a plurality of aligned mobile towers supporting the sprinkler line across the field to be irrigated. Coupling 108 can be any conventional structure such as those used on the successive towers of a sprinkler line which permit sufficient flexibility along the sprinkler line so as to accommodate changes in the level of the ground and the necessary dressing or alignment of the sprinkler line as it moves down a field. Instrumentation for maintaining alignment of a sprinkler line has been developed and perfected and is no part of the present invention. However, the tractor 36 of the present invention does act as a moving "anchor" at the main line from which point in one or both directions alignment of the sprinkler line is maintained.

Tower 40 includes provision of a platform 110 for supporting casing 78, motor-generator set 80, 81 and electronic instrumentation cabinet 82. Tractor 36 need not necessarily be in the form of two towers bridged and braced by a truss; any form of tractor apparatus capable of carrying necessary power equipment and having structure of sufficient height to support the rotating water receiving conduit junction 45 and associated water carrying arm 43 in connectable relation to risers 34 being all that is necessary.

It will be understood from the description thus far that water receiving conduit junction 45 is connected on the water inlet side to water carrying arm 43 and on the water outlet side to rigid pipe 47 and thence to pivotal or swivel conduit means 49, all constituting an integrated structure for bringing coupling member 57 into successive water conducting connection with consecutive risers 34 through the medium of the special valves 35 in risers 34 and the to-be-described cooperating valve opener structure associated with the coupling member.

Water receiving conduit junction 45 is rotatably suspended from rolling carriage or movable support means 112, this carriage being mounted on four identical rollers 113 which ride transversely of the path of movement of the tractor in a trackway 114 suspended from truss 41 by structural members 100.

Figure 4:
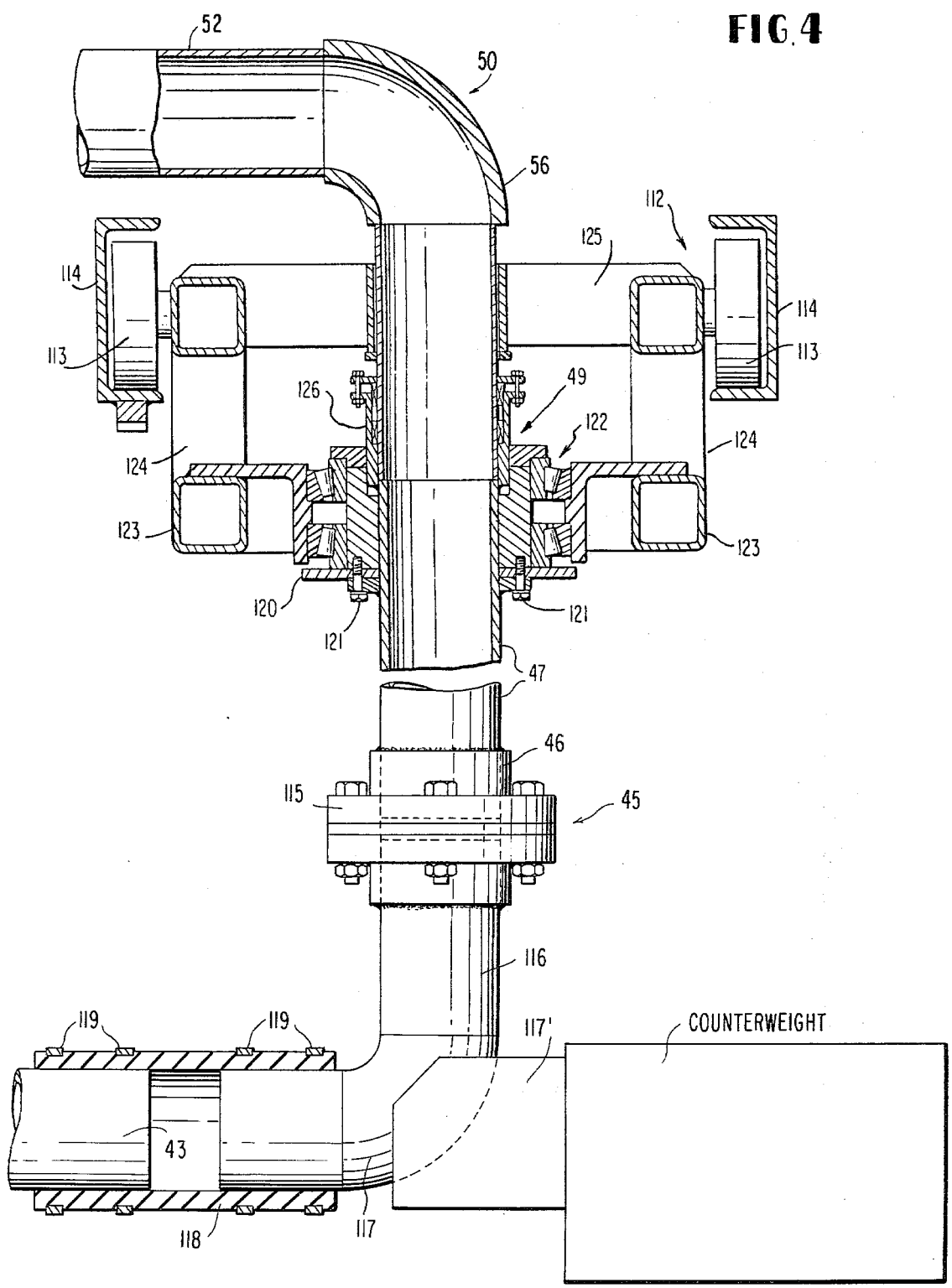
FIG. 4 is an enlarged fragmentary view in vertical section of a component of the embodiment illustrated in FIGS. 1, 2 and 3.

The structure involved in the connection of water receiving junction means 45 with rigid pipe 47 and the connection of rigid pipe 47 with swivel conduit means 49 is best illustrated in FIG. 4. At the water receiving junction means 45 water flow structural pipe 47 is rigidly mounted in outlet 46 of the casing 115 of the conduit junction means. Water carrying arm 43 has a water outlet end portion connected to the water receiving junction means 45 through a short pipe section 116 rigidly mounted in the junction means and through an elbow 117 and a flexible connection made up of a short section of heavy structural strength rubber hose 118. The rubber hose section connects the end portion of the water carrying arm to the junction means with some degree of flexibility but overall the water carrying arm can be considered to be rigid between its end portions. Each end of the section of flexible hose 118, respectively, telescopically receives the end section of elbow 117 and the end portion of water carrying arm 43. High tensile steel bands 119 are tightened in known manner around the portions of the hose section telescopically receiving elbow 117 and the end portion of arm 43. As already described, cables 62 and hydraulic cylinders 65 support the water carrying arm vertically but with hose section 118 permitting slight movement of the arm in any direction by flexing of the hose section.

Where desired a counterweight can be associated with water carrying arm 43 by having elbow 117 incorporate an integral bracket 117' supporting the counterweight.

The entire water receiving junction means 45 and water carrying arm 43 structure is carried on rigid structural pipe 47 which in turn is suspended from rolling carriage 112 through the medium of swivel conduit means 49. The form of swivel conduit means 49 illustrated in FIG. 4 comprises a flange 120 rigidly mounted as by welding on structural pipe 47, flange 120 being suspended by lug bolts 121 from the rotatable components of a roller bearing structure 122. Roller bearing structure 122 constitutes a support means for pivotally supporting elongated water carrying arm 43 through the medium of pipe 47. The stationary components of the roller bearing structure are supported by a framework 123 suspended by structural members 124 from rolling carriage 112. The water receiving elbow 56 of pivotally segmented conduit 50 is rotatably received by a bracing structure 125 rigidly carried by the rolling carriage 112. The upper end of structural pipe 47 is rigidly sealed and connected as by welding to one component of a packing gland 126, the packing gland sealing the swivel joint between conduits 47 and 56 against water leakage. By this construction, the water receiving junction means and all associated structure are supported for any desired degree of rotation.

As already noted above, swivel conduit means 49 constitutes two independently rotatable swivel joints, one between rigid pipe 47 and rolling carriage 112 and a second between rigid pipe 47 and the water inlet end of rigid conduit 50.

In the disclosed embodiment a rigid strut 135 connects wheel 69 with water carrying arm 43 so that when wheel 69 comes into contact with a pad 44, rigid strut 135 and wheel 69 can, as described below, exactly position coupling member 57 at the right height for connection with the valve 35 of the riser involved. Water carrying arm 43, when its coupling member 57 is not contiguous to or connected to a riser, is preferably maintained at a height above the ground greater than the heights of the risers by means of hydraulic cylinder 65 and cable 62, thereby suspending the wheel 69 out of contact with the ground. As coupling member 57 approaches a riser, hydraulic cylinder 65 is activated to start lowering the water carrying arm 43 so as to bring wheel 69 into contact with the concrete pad 44 at the riser. This will initiate the operation of a mechanism to deactivate hydraulic cylinder 65 so as to position coupling member 57 at the right height for coupling with the riser valve.

Figure 5:
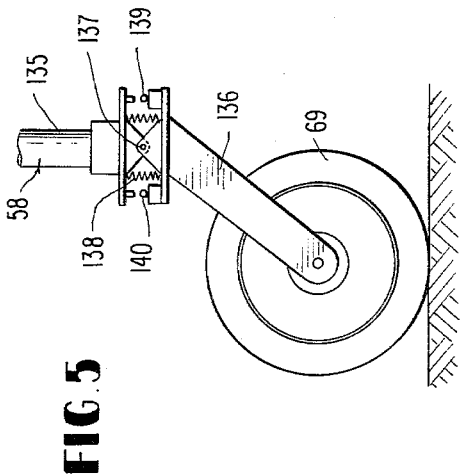
FIG. 5 is an enlarged fragmentary view in side elevation of a component of the embodiment illustrated in FIGS. 1, 2 and 3.

This action can be accomplished utilizing the mechanism illustrated in FIG. 5. In this mechanism, the wheel mounting fork 136 for wheel 69 is pivotally connected at 137 to the lower end of strut 135. A compression spring 138 maintains fork 136 in the position shown in this figure when wheel 69 is carrying a predetermined fraction of the weight of the water carrying arm. When wheel 69 is carrying less than this fractional weight or is suspended above the ground, fork 136 moves downwardly and microswitch 139 is actuated. During movement of the water carrying arm between risers this switch circuit is blocked but as the coupling member approaches the pad of a riser and cylinder 65 starts lowering the water carrying arm, this switch circuit is unblocked and actuation of microswitch 139 gives an electrical signal which assures continuation of this arm lowering operation. When wheel 69 contacts the ground or preferably concrete pad 44, fork 136 moves upwardly or in a clockwise direction around pivot 137 to thereby deactivate microswitch 139 and actuate microswitch 140. Actuation of microswitch 140 will reverse the action of hydraulic cylinder 65 to take weight off wheel 69 until compression spring 138 positions fork 136 in a position where neither microswitch is actuated, thereby deactivating cylinder 65 and stopping movement of the coupling member in a position at the proper height for coupling with the riser valve. Thus it will be seen that even some slight canting or departure from the horizontal of water conduit junction 45 due to differences in ground level over which tractor 36 is traveling, taken with some tolerance present in the operation of coupling member 57, is accommodated by the mechanism just described. It is important that moving water carrying arm 43 while not connected to or approaching a riser be maintained at a sufficient elevation above the ground by the associated hydraulic cylinder 65 and cable 62 so that a wheel 69 does not strike the ground with sufficient force to damage the microswitches 138, 140.

Figure 6:
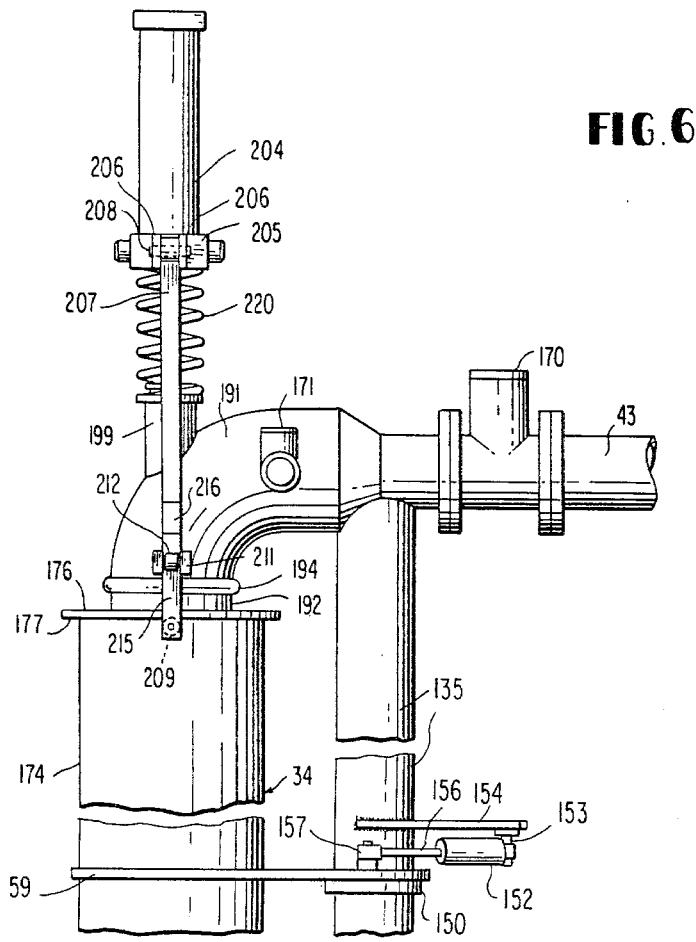
FIG. 6 is an enlarged view in side elevation of the structure at the outer end of the single water carrying arm illustrated in FIGS. 1, 3 and 4.
Figure 7:
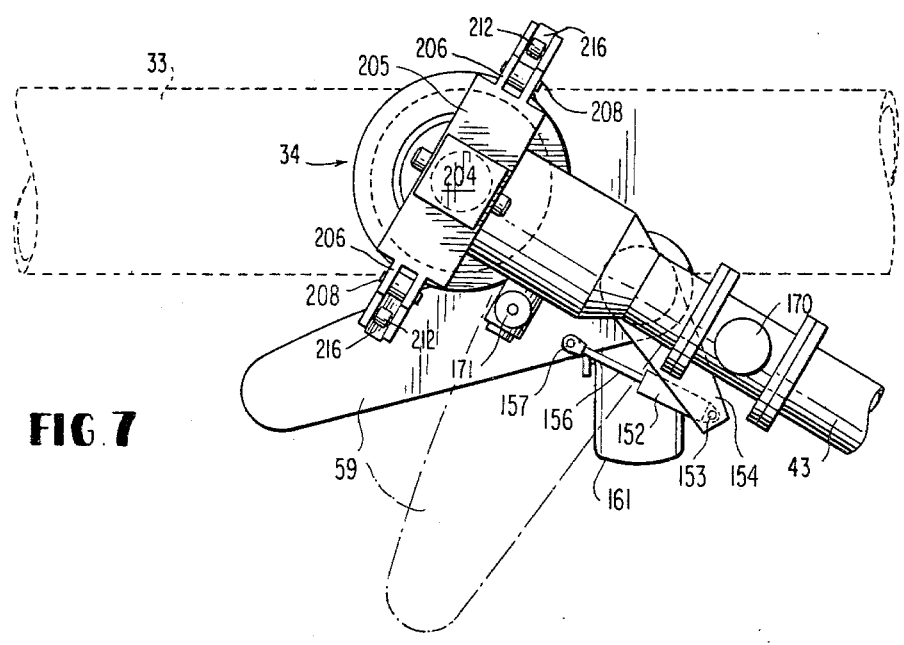
FIG. 7 is a plan view of the structure illustrated in FIG. 6 and showing the water main line in phantom.

Referring now to FIGS. 6 to 8, the details of the structure at the end of water carrying arm 43 including coupling member 57 and the special outlet valves 35 on risers 34 will be described in detail. In FIGS. 6 and 7 reference numeral 170 indicates an electric solenoid operated water flow control valve for opening and closing water bearing arm 43, this valve being closed at all times that the water bearing arm is not in water flow relation to an outlet valve 35. Reference numeral 171 indicates a solenoid operated bleeder valve the function of which will be explained below.

Considering the FIG. 1 showing which is based on the assumption that the arm 43 and its coupling member 57 have been connected to the farthermost water outlet valve 35 to the left and are being disconnected from that water outlet valve, arm 43 will then swing (as indicated in dashed lines) toward connection with the next outlet valve 35 to the right. FIGS. 6, 7 and 8 will be described in reference to arm 43 and coupling member 57 as the latter enters into contiguity with the next water outlet valve 35 to the right guided in the horizontal plane by riser locator 59 to vertical alignment with the water outlet valve and then lowered vertically by hydraulic cylinder 65 as actuated by the microswitch mechanisms 138, 139 of FIG. 5. All water outlet valves 35 are the same in construction so description of connection with one will suffice for all.

FIGS. 6, 7 and 8 show that the actual riser pipe 34 in each case incorporates a pipe 173 which is protected against impact by a casing 174 filled with concrete 175. The concrete pad 44 also aids in protecting the riser structure. At its upper end riser pipe 173 carries the water outlet valve 35, which valve structure is centered in casing 174 by a reinforcing plate 176 attached to the upper end of casing 174 with a horizontal flange 177 projecting outwardly of the casing and extending around its entire periphery.

Water outlet valve 35 further comprises an enlarged housing 180 enveloping the valve structure proper, the latter consisting of a supporting spider 181 which slideably receives a valve stem 182 carrying the valve closure disc 183, spring pressed by coil spring 184 into seating engagement with valve seat 185. A cylindrical portion 186 of the valve housing 180 extends upwardly into sealing engagement with plate 175. A groove and an internally positioned O-ring indicated at 187 are located at an intermediate point in the height of the cylindrical portion 186.

The coupling member 57 has enlarged housing 191 which includes a cylindrical downwardly extending portion 192 housing a reciprocating telescopingly received cylindrical water conducting member 193, cylindrical portion 192 having a groove and an internally positioned O-ring 194 at an intermediate point in the height of cylindrical portion 192. The O-ring seals the space between cylindrical portion 192 and cylindrical water conducting member 193 while permitting reciprocating movement of water conducting member 193. A spider 195 carried by the uppermost portion of the water conducting member 193 slideably receives a rod-like valve actuating member 197 while permitting water to pass through housing 191 to valve 170 and water carrying arm 43. Housing 191 has projecting through its wall a packing gland 199 which permits valve actuating member 197 to extend out of the casing while permitting water sealed reciprocating movement thereof through the housing wall. A collar 201 fixedly secured to valve operating member 197 supports cylindrical water conducting member 193 with cylindrical water conducting member 193 being slideable on valve actuating rod 197. A second collar 202 is fixedly secured on valve actuating rod 197 above spider 195 of water conducting member 193. The uppermost portion of valve actuating rod 197 is integral with the lower end of a piston rod 196 which enters into and is joined to a piston in a hydraulic cylinder 204. A bracket 205 is fixedly secured to the lower end of cylinder 204, bracket 205 having ears 206, 206 at its outer ends for pivotally supporting a pair of depending arms 207, 207 on pins 208, 208. At their lowermost ends depending arms 207 carry inwardly projecting rollers 209, 209 designed to engage under flange 177 and rotate in respect thereto with the underside of flange 177 acting as a circular track or bearing surface. On the depending cylindrical portion 192 of housing 191 a bracket is fixedly secured having outwardly extending bifurcated arms 211, 211 forming slots through which depending arms 207 slideably pass. At the outer end portions of such slots are pins 212, 212 and on the innermost portion of such slots are two additional pins 213, 213. Pins 212 and 213 cooperate with camming surfaces on opposite sides of a pair of identical camming members 215, 215, one set of camming surfaces being indicated at 216, 216 and the other set of camming surfaces being indicated at 217, 217.

Surrounding valve piston rod 196 where it enters cylinder 204 and disposed between the lowermost end of cylinder 204 and the upper surface of packing gland 199 is a strong coil spring 220 which can be held in its compressed state when the piston rod end 196 of valve actuating rod 197 is in fully retracted position in cylinder 204.

FIGS. 6 and 7 show the coupling member, indicated generally at 57, in coupled position with the casing 174 of a riser 34. FIGS. 8A, 8B, 8C and 8D demonstrate how the components of coupling member 57 make the connection with riser casing 174, seal off the joint between the coupling member and the outlet valve 35, and open valve 35.

As will be seen in FIG. 8A, as the coupling member approaches riser 34 and is guided into vertical alignment with outlet valve 35 by locator member 57, rollers 209 are held in such spaced relation from each other that they will clear flange 177. Additionally, the distance between rollers 209 and the lowermost edge of cylindrical coupling element 192 is appreciable and allows tolerance, if needed, relative to the height and slight possible canting of coupling member 57 relative to the water outlet valve while still positioning the parts for connection. It will also be clear that coupling member 57 can approach riser 34 at a considerable height so long as locator member 59 can make contact with casing 174 of the riser.

Starting with the operating parts of coupling member 57 and outlet valve 35 as shown in FIG. 8A, the hydraulic fluid on the lower side of the piston in cylinder 204 has its pressure reduced permitting coil spring 220 to push cylinder 204 and framework 205, 207 upward relative to arms 211. Upon such movement, cam surfaces 216, 216 move rollers 209 inwardly and as cylinder 204 and the depending framework continue to move upwardly, rollers 209 engage flange 177. Coil spring 220 is strong enough, acting through the depending framework and rollers 209 under flange 177 to hold the coupling member and outlet valve 35 in registry ready for water-tight coupling and subsequent valve opening actions, as shown in FIG. 8B.

Considering next the transition from FIG. 8B to FIG. 8C, with the coupling member in the position shown in FIG. 8B, the hydraulic fluid in cylinder 204 is increased in pressure on the upper side of the piston to extend piston rod 196 downwardly to cause collar 202 to engage spider 195 and thereby move cylindrical water conduit member 193 downwardly into the cylindrical portion 186 of outlet valve housing 180, the chamfered lower edge of cylindrical water conduit 193 assuring registry and a telescoping relationship of that part within the cylindrical portion 186 of outlet valve housing 180.

As shown in FIG. 8D, continued movement of piston rod 196 and valve actuating rod 197 carries cylindrical water conduit member 193 farther down and into sealing engagement with O-ring 187 thereby completing the sealed water flow passage between the outlet valve housing 180 and the water carrying arm, and water can flow through this passage as the completion of the movement of valve operating rod 197 pushes valve plate 183 open against the pressure of spring 184.

Since a short interval of time elapses from the time locator member 59 brings coupling member 57 into contiguity with an outlet valve 35 until the coupling member is in position to open the outlet valve 183, a time-delay mechanism, not shown, is included to delay valve opening operation of the valve operating rod 197.

A water pressure sensitive control (not shown) in housing 191 in association with electronic controls back at the conveyance closes bleeder valve 171 and opens solenoid water flow control valve 170.

It will be noted that rollers 209 and associated structure, taken with the limited flexibility of arm 43 stemming from hose section 118, permit water carrying arm 43 to rotate around the riser 34 while maintaining water-tight connection of coupling member 57 with outlet valve 35.

Before breaking the coupling member 57 connection, a control at 83 acts to close solenoid valve 170 and open the bleeder valve 171, in FIGS. 6 and 7. The bleeding action is advisable to gradually relieve the water pressure differential across the valve elements.

It is to be understood that there can be an appreciable time lag in making the connection and valve opening at an outlet valve (for example one to several minutes) because the tractor 36 and the sprinkling line can pause, the lack of any forward movement of the line for long enough to break the connection at one riser, swing the water carrying arm 43 and make the connections at the next riser having no objectionable effect. The sprinkling action will stop momentarily but valve 170 being closed at all times coupling member 57 is not in water flow relation with an oulet valve, water will not drain out of the sprinkling line.

The showings in FIGS. 8D, 8C, 8B and 8A in that order illustrate the sequence of actions in breaking the connection between coupling member 57 and the associated outlet valve 35. Considering the final step shown in FIG. 8A it will be noted that increasing the pressure on the lower side of the piston in hydraulic cylinder 204 compresses spring 220, at the same time pulling up arms 207 and causing cam surfaces 217, 217 to spread arms 207 and disengage rollers 209 from the undersurface of flange 177, permitting coupling member 57 to move away from the outlet valve 35.

Inspection of FIG. 1 will indicate that during operation when tractor 32 in its path paralleling main line 33 reaches a point midway between two risers 34, a control (not shown) at either end of arm 43 or on carriage 112 will cause the tractor to stop since in the position shown in solid lines, the tractor has come to the point where water carrying arm 43, when swung clockwise (as shown in dashed lines) will bring coupling member 57 into contiguity with the next outlet valve 35 for coupling therewith. Coordinating components in box 83 act in response to an indicator associated with arm 43 or carriage 112 to stop movement of tractor 36 at this point and additionally at 83 at that time act to close solenoid valve 170 and initiate the actuation of the coupling member 57 to go through the sequence of operations illustrated in FIGS. 8D, 8C, 8B and 8A in that sequence. By the time valve 183 is closed in this sequence of operations, bleeder valve 171 is opened and when the stage illustrated in 8A is reached, hydraulic cylinder 65 lifts coupling member 57 out of engagement with riser 34.

At this point, power actuated means are utilized to rotate arm 43 clockwise in FIG. 1 through the path as indicated in the two dashed line positions around into the dashed line position with coupling member 57 contiguous to the next riser 34. The power means necessary at this point in operation is any suitable means for rotating, pivoting or swinging arm 43. One such means is described below. As already described, hydraulic cylinder 65 during this swinging action has supported wheels 69 above the ground and as coupling 57 comes into propinquity to that riser it is guided by locating means 59 so as to be aligned vertically with valve 35 in that riser and the sequence of operations in connection with the member 115 in wheel 69 support brings the coupling member into registry with the top of outlet valve 35 in the position shown in FIG. 8A. At this time or at any time after locating means 59 has served its purpose up to the time arm 43 is disconnected from the riser, locating means 59, which is pivotally mounted on strut 135 and supported at the desired elevation by supporting ring 150, is swung back as shown in dashed lines in FIG. 7 to clear riser 34 as arm 43 moves away from the riser as shown in dashed lines in FIG. 1. The means for carrying out this action is a hydraulic cylinder 152 pivotally mounted at one end at 153 on a bracket 154 welded to strut 135, the hydraulic cylinder having a piston rod 156 pivotally connected at 157 to locating means 59. Part of the coordinating means at 83 activate cylinder 152 at the desired time. Where desired, more sophisticated sensing means can be depended upon to bring coupling member 57 into registry with each outlet valve 35, such sensing means being available in the art. The coupling action is then completed as shown in FIGS. 8B, 8C and 8D in that sequence. At that time, coordinating means 83 can simultaneously with starting movement of tractor 36 to the right, actuate power means associated with movement of carriage 112 away from the main line and/or again apply rotating power to water receiving conduit junction means, if either or both are needed.

Figure 3:
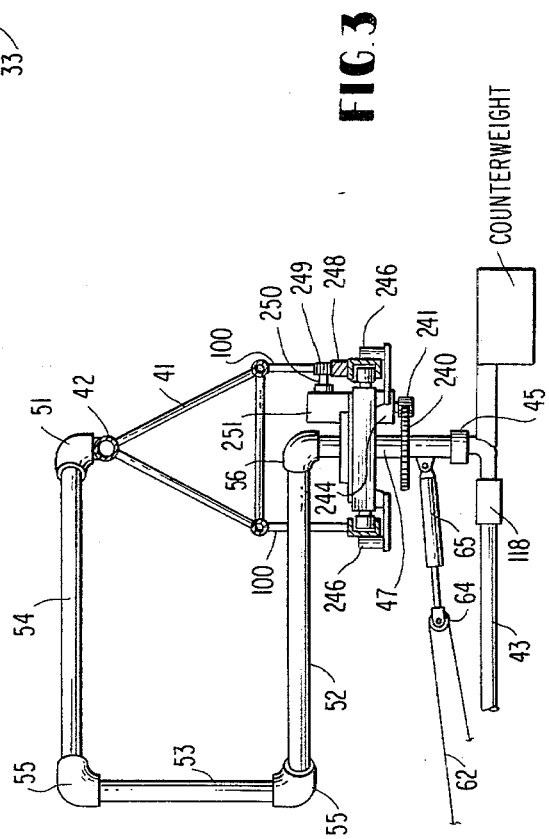
FIG. 3 is a view in vertical section taken on the line 3—3 of FIG. 2.

The power actuated means for rotation of arm 43 and assisting linear movement of carriage 112 are best shown in FIGS. 1, 2 and 3. Since the reaction between the water carrying arm and in the riser to which the arm is rotatably connected and the amount of movement of carriage 112 along trackway 114 vary in magnitude depending upon the changing angular position of water carrying arm 43 as it rotates around the riser, a desirable form of power assist is a slip-clutch or fluid drive type arrangement. Thus, considering FIG. 1, with water carrying arm 43 coupled with the associated riser valve 35 in the angular position shown in dashed lines, upon tractor 36 starting to move to the right in this figure a large component of force in compression would be exerted on water carrying arm 43 along its length by reaction at the associated riser valve 35 because of the acute angle of the water carrying arm to the direction of movement of tractor 36. Utilizing fluid drive, for example, a desired amount of arm rotating torque can be applied to rigid water flow pipe 47 and/or a desired amount of outwardly directed force on carriage 112 can be supplied to cause the necessary movement of water carrying arm 43 without objectionably stressing the structures involved.

Power actuated means are therefore provided for the disclosed embodiment in respect to the last described problem and such power assist means can be associated with the rotation of the water carrying arm or with the reciprocating movement of the water manifold toward or away from the direction of the water main or with both. As already mentioned the means for rotating arm 43 or some equivalent force is necessarily present for swinging the arm from riser to riser and of course this means can serve both purposes.

Referring especially to FIGS. 2 and 3, the means for rotating arm 43 from one riser to another and for taking stress off the riser due to movement of tractor 36 and resistance of water bearing arm 43 to rotation is shown as comprising a gear 240 fixedly mounted on rigid water flow pipe 47 which carries water receiving conduit junction 45 and the water carrying arm. The teeth of gear 240 engage a pinion gear 241 mounted on a shaft 242 of a conventional combination electric motor and fluid drive device 244. The combination electric motor and fluid drive device can be designed to supply sufficient torque to the rotating water receiving conduit junction 45 and water bearing arm 43 so that no objectionable stress is placed on the coupled riser, the coupled water bearing arm or the water receiving conduit junction supporting structure due to movement of tractor 36 and rotative forces on arm 43.

Relative to reciprocating motion of carriage 112, it will be observed from FIG. 1 that as the tractor 36 moves in the direction of the arrow along the main line the force applied to water bearing arm 43 as shown in dashed lines by the riser 34 to which the arm has just been coupled has a large vector component which would tend to bend rigid water flow pipe 47 and possibly rigid water carrying arm 43 and to urge carriage 230 objectionably against its side thrust bearings 246. To obviate this stress on the structures involved, one form of power assist is shown as a rack 248 on one track 114 extending lengthwise of the trackway. A pinion gear 249 carried by a shaft 250 is shown operatively meshed with rack 248, the shaft being turned by a conventional combination electric motor and fluid drive device 251. Combination electric motor-fluid drive device 251 can be utilized to place a driving torque on pinion gear 249 and rack 248 sufficient to remove objectionable stresses from water carrying arm 43, water receiving conduit junction 45, rigid water flow pipe 47 and carriage 112 by moving the carriage along trackway 114 with a force that balances a desired portion of the force which would otherwise be applied by riser 34 along the length of water carrying arm 43. When carriage 112 reaches the end of track 233, which is when tractor 36 is lined up with the riser, an electric trip switch (not shown) can be utilized to reverse the direction of rotation of the combination electric motor-fluid drive device, and the force applied to carriage 112 by pinion gear 249 and rack 248 will then act on carriage 112 in the direction of the main line in a manner to remove objectionable stresses applied through water carrying arm 43 to water receiving conduit junction 45 and thence to rigid flow pipe 47 and carriage 112 by tension applied to water carrying arm 43 at riser 34.

Where desired, more sophisticated controls can be utilized in relation to combination electric motor and fluid drive devices 244 and 251 by incorporating stress indicating devices at the coupling member of the water bearing arm, operative when the coupling member is coupled to a riser valve 35 which will control the speed of the electric motor or the torque delivery characteristics of the fluid drive component or components being used to vary the torque outputs so as to exactly balance the stress which would otherwise be applied along the length of the coupled water bearing arm involved.

FIG. 9 discloses a modified form of the structure illustrated in FIG. 4. The major functional elements shown in FIG. 4 appear in FIG. 9 and therefore where practicable the same reference numerals as those used in FIG. 4 appear in FIG. 9 with 300 added to each, thereby avoiding where possible a repetition of descriptive material.

In the modification of FIG. 9, the rotating rigid pipe 47 of FIG. 4 is replaced by a fixed, non-rotating pipe or conduit 500 which includes provision for rotatably supporting an element 501 which will be called for claim terminology purposes a water receiving conduit junction means. Carriage 412, which constitutes a primary part of the overall support means, has welded to its depending structure 423, 424 a machined element 503 which is welded to members 423 at 505. Rigid pipe or conduit 500 is welded at 507 to a plate 509 which in turn is attached by stud bolts 511, 511 to machined plate 503, thereby supporting fixed conduit 500 thereto and to carriage 412. Also welded to fixed conduit 500 at 513 is a plate 515 carrying a bearing structure 517 which rotatably receives a structural ring 519.

The lower portion of rigid conduit 500 incorporates a plurality of circumferentially disposed water flow openings 521. Registering with openings 521 is a water receiving passageway or chamber 523 formed by a fitting 525 which sealingly receives a short pipe 527, pipe 527 being connected to arm 343 in a manner similar to the arm 43 arrangement of FIG. 4. Fitting 525 also carries a bracket 529 which supports a counterweight 531 180° removed from the connection of water carrying arm 343 with fitting 525. The upper and lower extremities of fitting 525 respectively carry packing glands 533 and 535 respectively.

The packing retainer element of the lower packing gland 535 is combined with a plate 537 which closes the lower end of rigid conduit 500 and is held in place by stud bolts 539.

Structural ring 519 carries a pair of structural ears for supporting fitting 525 and its associated structure by means of similar structural ears 543, 543 carried by fitting 525, acting through right and left-hand strew threaded rods 545 acting in conjunction with turnbuckles 547. One ear 541 also serves to anchor the end of arm 343 supporting hydraulic cylinder 465, corresponding to cylinder 65 in the embodiment already described.

Plate 537 can be in the form of a gear with circumferential teeth 551 which engage the teeth of a pinion gear 553 carried by a shaft 555, the shaft being driven by a conventional electric motor-fluid drive element 557, the latter being supported on a bracket 559 carried by fitting 525. Gearing 537, 551, 553 and electric motor-fluid drive element 557 correspond to elements 240, 241 and 244 of the embodiment already described, their purpose being to rotate arm 343 from one riser to the next and where desired to assist in rotation of arm 343 at other times.

The remainder of the water passageway shown in the FIG. 9 structure includes conduit 350 which is rotatably received in packing gland 561 formed in a projecting neck 563 of machined element 503. Carriage structural element 425 rotatably receives and guides conduit 350 as it rotates, a bearing 565 assuring smooth operation. Neck 563 includes another packing gland 567 separated from packing gland 561 by a metal ring 569, packing gland 567 sealing off the upper end of fixed conduit 500.

In operation, the modified structure of FIG. 9 supplies with different structure the same function as the structure of FIG. 4. Arm 344 supported by hydraulic cylinder 465 and the associated cable, and also by right and left-hand screw couplings 547 can rotate around structural conduit 500 with a continued water passageway for water flow through openings 521 and thence through the remaining passageway upwardly to conduit 350. Conduit 350 can rotate as necessary to make continuous water flow connection at 51 with water conduit 42 going to the water sprinkler line.

The plurality of sprinkler line components can be aligned by the driving motors of individual sprinkler components starting and stopping independently. In this way the sprinkler line and the tractor move along the main line together at the same overall rate of movement but not usually in synchronism. The term "overall rate of movement" is intended to embrace a form of operation where the control components at 83 acting on constant speed electrical motors driving wheels 28, 36 and all the wheels on the sprinkling line towers cause individual motors to operate at different times as called for by the line alignment control elements usually located at the towers. Thus one tower may be moving when other towers are not or vice versa and, although not usually, on occasion all towers may be moving at the same rate, all depending on the nature of the terrain, wheel slippage and other factors. The tractor however is programmed to control the overall rate of movement of the entire apparatus along the main line.

Throughout the specification, references have been made to operation of the various parts and coordination of components of the apparatus to accomplish the functional desiderata. All the electronic and programming equipment needed for carrying out these functions are well known in the art and therefore the specification and drawings have not been complicated by their inclusion.

The conveyance is shown on one side of the sprinkler line; however, the conveyance, i.e., the apparatus carrying the water receiving conduit junction and water carrying arm can be located at an intermediate point on the sprinkler line so long as the water main line is accessible to the water carrying arm.

Where in the claims the term "water carrying conduit" is used, the fact that the resilient hose section 118 and the water receiving conduit junction are not included in the length of the water carrying conduit or arm is to be understood.

Where desired a downward force exerted on the water carrying arm can be utilized to form a connection between the coupling or connecting member and the associated water outlet valve means of the water main line instead of the coupling means illustrated in FIGS. 8A, 8B, 8C and 8D.

The above embodiments are to be considered in all respects as illustrative and not restrictive since the invention may be embodied in other specific forms without departing from its spirit or essential characteristics. Therefore, the scope of the invention is indicated by the claims rather than by the foregoing description, and all changes which come within the meaning and range of the equivalents of the claims are intended to be embraced therein.

I claim:

1. In connection with land irrigation wherein a moving sprinkler means having a water inlet means at one point moves along the length of a stationary water supply means having a plurality of water outlet valve means at spaced intervals along the length thereof, the method of successively connecting water outlet valve means of the stationary water supply means with water inlet means of the water sprinkler means to obtain substantially continuous water supply to the water sprinkler means comprising providing a conveyance means for movement along the length dimension of the stationary water supply means at the same overall rate of movement as the moving water sprinkler means, the conveyance means carrying a support means supporting an elongated water conduit means for rotation of the elongated water conduit means around one end portion of the elongated water conduit means, the elongated water conduit means including water flow control valve means for closing the elongated water conduit means to water flow and having connecting means at the other end portion of the elongated water conduit means for rotatable water flow connection of the elongated water conduit means with any water outlet valve means, the elongated water conduit means being rigid from one end portion to the other end portion and having water outlet means connecting said one end portion of the elongated water conduit means for continuous water flow from the elongated water conduit means to the water inlet means of the water sprinkler means during water flow connection of the other end portion of the elongated water conduit means with a water outlet means, the steps including closing the elongated water conduit means water flow control valve means, rotating the elongated water conduit means around the one end portion of the elongated water conduit means to bring the other end portion of the elongated water conduit means into contiguity with a water outlet valve means, rotatably connecting the connecting means at the other end portion of the elongated water conduit means to the contiguous water outlet valve means for water flow through the elongated conduit means to the sprinkler means, opening the elongated water conduit means water flow control valve means, subsequently rotating the so-connected elongated conduit means around the connected water outlet valve means while moving the conveyance means along the length dimension of the stationary water supply means, and accommodating the rigidity of the elongated water conduit means during movement of the conveyance means by supporting the support means for movement toward and away from the stationary water supply means on a movable support means carried by the conveyance means, the movement being between a position of the support means closest to the water supply means when the conveyance means is far from any one of the water outlet valve means and a position of the support means farthest from the water supply means when the conveyance means is close to any one of the plurality of water outlet valve means.

2. The method as claimed in claim 1 wherein
the movement of the support means is straight line movement toward and away from the stationary water supply means.

3. The method of claim 1 including closing the elongated water conduit means water flow control valve means, disconnecting the connecting means of the elongated conduit means from the water outlet means after the conveyance means has passed the water outlet valve means and utilizing power actuated means to rotate the elongated conduit means around the one end portion of the elonated water conduit means to bring the connecting means at the other end portion of the elongated conduit means into contiguity with a succeeding water outlet valve means of the stationary water supply means in the direction the conveyance has been moving along the length dimension of the stationary water supply means.

4. The method of claim 2 including closing the elongated water conduit means water flow control valve means, disconnecting the connecting means of the elongated conduit means from the water outlet means after the conveyance means has passed the water outlet valve means and utilizing power actuated means to rotate the elongated conduit means around the one end portion of the elongated water conduit means to bring the connecting means at the other end portion of the elongated conduit means into contiguity with a succeeding water outlet valve means of the stationary water supply means in the direction the conveyance has been moving along the length dimension of the stationary water supply means.

5. For use in connection with a land irrigating system in which a moving water sprinkler means having water inlet means at one point extends laterally to and moves along the length dimension of a stationary water supply means having a plurality of water outlet valve means at spaced points along the length thereof, an apparatus for successively connecting water outlet valve means of the stationary water supply means with water inlet means of the water sprinkler means comprising conveyance means for moving along the length dimension of the stationary water supply means at the same overall rate of movement as the moving sprinkler means, a single elongated water conduit means rigid from one end portion to the other end portion, support means carried by the conveyance means for pivotally supporting the elongated water conduit means by the conveyance means for rotation of the elongated water conduit means around one end portion of the elongated water conduit means, water conducting means connecting the one end portion of the elongated water conduit means and the water inlet means of the water sprinkler means for uninterrupted water flow to the water sprinkler means as the elongated water conduit means rotates, connecting means at the other end portion of the elongated water conduit means for rotational water flow connection with successive water outlet valve means, water flow control valve means for closing the elongated water conduit means to water flow therethrough, movable support means carried by the conveyance means for mounting the support means for movement relative to the conveyance means toward and away from the main line to accommodate the length of the elongated water conduit means, and power actuated means for rotating the elongated water conduit means around the one end of the elongated water conduit means when the connecting means is disconnected from one water outlet valve means to bring the connecting means of the elongated water conduit means into contiguity with a succeeding water outlet valve means of the stationary water supply means in the direction the conveyance means has been moving along the length dimension of the stationary water supply means, the movable support means being carried by the conveyance means for movement toward and away from the water supply means between a position of the movable support means closest to the water supply means when the conveyance means is far from any one of the plurality of water outlet valve means and a position of the movable support means farthest from the water supply means when the conveyance means is close to any one of the plurality of water outlet valve means.

6. Apparatus as claimed in claim 5 including power actuated means carried by the conveyance means for at least assisting in the movement of the movable support means.

7. Apparatus as claimed in claim 5 including means for supporting the movable support means for straight line movement toward and away from the water supply means.

8. Apparatus as claimed in claim 7 including power actuated means carried by the conveyance means for at least assisting in the movement of the movable support means.

9. Apparatus as claimed in claim 5 including means for opening a succeeding water outlet valve means when the power actuated means has brought the connecting means into contiguity with the succeeding water outlet valve means and the connecting means is in water flow connection with the succeeding water outlet valve means, means for initiating movement of the conveyance means along the length dimension of the stationary water supply means so as to rotate the one end portion of the elongated conduit means relative to the support means carried by the conveyance means and rotate the other end portion of the elongated conduit means around the outlet water valve means to which it is connected, means for stopping movement of the conveyance means when the conveyance means is at an intermediate point between the outlet valve means to which the elongated conduit means is connected and the next succeeding water outlet valve means along the length dimension of the stationary water supply means, means for closing the water outlet valve means to which the connecting means of the elongated conduit means is connected, means acting to close the water flow control valve means, means for disconnecting the connecting means of the elongated water conduit means from the water outlet valve means to which the connecting means of the elongated water conduit means is connected, means for initiating action of the power actuated means to rotate the disconnected other end portion of the elongated conduit means to bring the disconnected other end portion into contiguity with the next succeeding water outlet valve means, and means for connecting the connecting means of the elongated conduit means in water flow relation with the succeeding water outlet valve means and opening the water outlet valve means.

10. Apparatus as claimed in claim 5, 6, 7, 8 or 9 wherein the conveyance means includes an elevated truss extending in a direction normal to and extending across the length dimension of the stationary water supply means, the end portions of the truss being supported by tower means on wheel means movable along the length dimension of the stationary water supply means, and the conveyance means includes means for supporting the support means and associated elongated water conduit means from above by the truss.

11. For use in connection with a land irrigation system in which a moving water sprinkler means having water inlet means at one point extends laterally to and moves along the length dimension of a stationary water supply means having a plurality of water outlet valve means at spaced points along the length thereof, an apparatus for successively connecting water outlet valve means of the stationary water supply means with water inlet means of the water sprinkler means comprising
- conveyance means for moving along the length dimension of the stationary water supply means at the same overall rate of movement as the moving water sprinkler means, the conveyance means having ground engaging wheel means on each side of the stationary water supply means and a rigid structural means extending between wheel means and spanning the stationary water supply means, one wheel means being adjacent and the other wheel means being remote from the stationary water supply means,
- movable support means mounted on the structural means for movement relative to the conveyance means along a path toward and away from the stationary water supply means,
- a single elongated water conduit means, rigid from one end portion to the other end portion, having a length less than the distance from the other wheel means to the stationary water supply means but not less than one half the distance between adjacent water outlet valve means,
- water flow conduit means carried by the movable support means having a lower portion connected for water flow from one end portion of the elongated water conduit means and an upper portion connected for water flow to the water inlet means of the water sprinkler means,
- means associated with the water flow conduit means supporting the elongated water conduit means for rotation of the elongated water conduit means around the one end portion of the elongated water conduit means,
- connecting means associated with the other end portion of the elongated water conduit means for successive water flow connection to and disconnection from the water outlet valve means on the stationary water supply means,
- means associated with the connecting means for rotatably connecting the connecting means in water flow connection relation with a rear outlet valve means for rotation of the other end portion of the elongated conduit means around the water outlet valve means,
- water flow control valve means for closing the elongated water conduit means,
- the path of movement of the movable support means in respect to the conveyance structural means being such as to accommodate the length of the elongated water conduit means as it rotates around a water outlet valve means, and
- power actuated means for rotating the elongated water conduit means around the one end of the elongated water conduit means when the connecting means is disconnected from one water outlet valve means to bring the connecting means of the elongated water conduit means into contiguity with a succeeding water outlet valve means of the stationary water supply means in the direction the conveyance has been moving along the length dimension of the stationary water supply means.

12. Apparatus as claimed in claim 11 including
power actuated means carried by the conveyance means for at least assisting in the movement of the movable support means.

13. Apparatus as claimed in claim 11 including
means for supporting the movable support means for straight line movement toward and away from the water supply means.

14. Apparatus as claimed in claim 13 including
power actuated means carried by the conveyance means for at least assisting in the movement of the movable support means.

* * * * *